US012579236B2

(12) United States Patent
Liu et al.

(10) Patent No.: US 12,579,236 B2
(45) Date of Patent: Mar. 17, 2026

(54) VEHICLE CONTROL APPARATUS AND VEHICLE CONTROL METHOD

(71) Applicant: HONDA MOTOR CO., LTD., Tokyo (JP)

(72) Inventors: Haisong Liu, Tokyo (JP); Ryo Morosawa, Tokyo (JP); Seonghun Lee, Tokyo (JP); Masahiro Tanigawa, Wako (JP); Kenya Sakurai, Tokyo (JP); Eiji Hirano, Wako (JP); Yuki Kagiya, Tokyo (JP); Koji Nomura, Tokyo (JP); Yuji Tsuchiya, Wako (JP); Mitsunori Nishino, Tokyo (JP); Toshihiro Kaneda, Tokyo (JP); Kenji Okuma, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 478 days.

(21) Appl. No.: 17/950,366

(22) Filed: Sep. 22, 2022

(65) Prior Publication Data

US 2023/0097220 A1 Mar. 30, 2023

(30) Foreign Application Priority Data

Sep. 27, 2021 (JP) ................................. 2021-157227

(51) Int. Cl.
| | |
|---|---|
| *G06V 10/25* | (2022.01) |
| *G06F 21/32* | (2013.01) |
| *G06T 7/62* | (2017.01) |
| *G06V 10/74* | (2022.01) |

(Continued)

(52) U.S. Cl.
CPC ................ *G06F 21/32* (2013.01); *G06T 7/62* (2017.01); *G06V 10/25* (2022.01); *G06V 10/761* (2022.01); *G06V 40/161* (2022.01); *G06V 40/172* (2022.01); *G06T 2207/30201* (2013.01); *G06T 2207/30252* (2013.01)

(58) Field of Classification Search
CPC . G06F 21/32; G06T 7/62; G06T 2207/30201; G06T 2207/30252; G06V 10/25; G06V 10/761; G06V 40/161; G06V 40/172; G06V 20/58; G06V 40/16
See application file for complete search history.

(56) References Cited

U.S. PATENT DOCUMENTS

| | | | | | |
|---|---|---|---|---|---|
| 9,865,103 | B2 * | 1/2018 | Kraeling | .............. | G07C 5/0866 |
| 10,486,649 | B1 * | 11/2019 | Bennie | ................ | B60R 25/1004 |
| 10,708,653 | B1 * | 7/2020 | Stinson | .............. | H04N 21/4415 |

(Continued)

FOREIGN PATENT DOCUMENTS

| | | | |
|---|---|---|---|
| JP | 2003-138817 | | 5/2003 |
| JP | 2019142126 A | * | 8/2019 |

*Primary Examiner* — Vincent Rudolph
*Assistant Examiner* — Keely Gwynne Yeargin
(74) *Attorney, Agent, or Firm* — Rankin, Hill & Clark LLP

(57) ABSTRACT

A vehicle control apparatus includes: a determination unit for determining, based on an image captured by a first camera with a first resolution, whether an object around a vehicle is a person or not; and a camera activation unit for activating a second camera when an image of the person as the object enters within a first area corresponding to a range of a first predetermined distance from the vehicle on the captured image, the second camera having a second resolution higher than the first resolution.

9 Claims, 9 Drawing Sheets

(51) Int. Cl.
   *G06V 20/58*      (2022.01)
   *G06V 40/16*      (2022.01)

(56) References Cited

U.S. PATENT DOCUMENTS

| | | | |
|---|---|---|---|
| 2006/0049962 A1* | 3/2006 | Okada | B60R 25/24 |
| | | | 340/901 |
| 2007/0013776 A1* | 1/2007 | Venetianer | H04N 5/76 |
| | | | 348/E7.086 |
| 2007/0269079 A1* | 11/2007 | Taniguchi | G06V 40/103 |
| | | | 382/104 |
| 2012/0053795 A1* | 3/2012 | Bos | B60R 11/04 |
| | | | 701/36 |
| 2012/0300076 A1* | 11/2012 | Aimura | H04N 7/18 |
| | | | 348/148 |
| 2013/0343613 A1* | 12/2013 | Heger | G01B 11/026 |
| | | | 382/106 |
| 2015/0169968 A1* | 6/2015 | Michmerhuizen | |
| | | | G08B 13/19647 |
| | | | 348/148 |
| 2017/0124404 A1* | 5/2017 | Yamane | G06V 40/103 |

* cited by examiner

VEHICLE CONTROL APPARATUS AND VEHICLE CONTROL METHOD

INCORPORATION BY REFERENCE

The present application claims priority under 35 U.S.C. § 119 to Japanese Patent Application No. 2021-157227 filed on Sep. 27, 2021. The content of the application is incorporated herein by reference in its entirety.

BACKGROUND OF THE INVENTION

Field of the Invention

The present invention relates to a vehicle control apparatus and a vehicle control method for controlling a vehicle-mount camera for face authentication.

Description of the Related Art

Conventionally, there has been proposed a smart entry system that performs user authentication by extracting iris information from an image of a person approaching a vehicle (see, for example, Japanese Patent Application Publication No. 2003-138817).

For recognition of a person approaching a vehicle by an image captured by a camera like the smart entry system, it is necessary to always execute image capturing using the camera, and an image recognition process for user authentication in preparation for the approach of a person. Therefore, there is a problem of an increase in electric power consumed by the camera.

In view of the above-mentioned background, the purpose of the present invention is to reduce unnecessary power consumption of a vehicle-mount camera, and accurately perform image authentication for a person approaching the vehicle.

The purpose is to improve the energy efficiency of the vehicle, and to provide access to a sustainable transport system, which can be used safely, easily and affordably, for all people by applying the present invention to an entry system using face authentication, thereby contributing to realization of the Sustainable Development Goals (SDGs 7.3, 7.a, 11.2).

SUMMARY OF THE INVENTION

An aspect of the present invention is a vehicle control apparatus including: a determination unit for acquiring a captured image of an object existing around a vehicle from a first camera with a first resolution, and determining, based on the acquired captured image, whether the object is a person or not; and a camera activation unit for setting a first area corresponding to a range of a first distance from the vehicle, on the captured image of the first camera, and activating a second camera when the image of a person as the object enters the first area, the second camera having a second resolution higher than the first resolution.

According to another aspect of the present invention, the camera activation unit activates the second camera when a residence time of the image of the person in the first area is equal to or more than a predetermined time.

According to other aspect of the present invention, the camera activation unit activates the second camera when the image of the person changes direction a plurality of times in a horizontal direction in the first area.

According to other aspect of the present invention, the camera activation unit activates the second camera when the image of the person enters the first area from an area outside the first area on the captured image of the first camera.

According to other aspect of the present invention, the camera activation unit activates the second camera when a size of the image of the person in the first area is larger relative to a size of the image of the person in the area outside the first area.

According to other aspect of the present invention, the camera activation unit does not activate the second camera when it is determined, based on the captured image of the first camera, that the person has entered within the range of the first distance from a place other than the range of the first distance without deceleration.

According to other aspect of the present invention, the vehicle control apparatus includes an authentication unit for acquiring a face image of the person by the second camera, and authenticating whether the person is a registered user or not, wherein the camera activation unit stops an operation of the second camera if the person is not authenticated by the authentication unit within a predetermined time after activation of the second camera.

According to other aspect of the present invention, when the number of times the second camera is stopped because the person is not authenticated within the predetermined time exceeds a predetermined number of times, the camera activation unit sets, inside the first area, a second area corresponding to a range of a second predetermined distance from the vehicle, the second predetermined distance being shorter than the first distance, and activates the second camera when the image of the person enters the second area.

According to other aspect of the present invention, the vehicle control apparatus includes a notification unit for giving a notification to the outside of the vehicle, wherein, when the camera activation unit determines that the image of the person is present in the first area outside the second area after setting the second area, the notification unit gives a mobile terminal of a predetermined person who is the registered user a notification that the second area is set.

According to other aspect of the present invention, when the camera activation unit determines that the image of the person is present in the first area outside the second area after setting the second area, the notification unit gives the notification to the outside of the vehicle.

Other aspect of the present invention is a vehicle control method to be executed by a computer of a vehicle control apparatus, the vehicle control method including: a step for acquiring a captured image of an object existing around a vehicle from a first camera with a first resolution, and determining, based on the acquired captured image, whether the object is a person or not; and a step for setting a first area corresponding to a range of a first distance from the vehicle, on the captured image of the first camera, and activating a second camera when the image of a person as the object enters the first area, the second camera having a second resolution higher than the first resolution.

According to the present invention, it is possible to accurately perform image authentication for a person approaching the vehicle, as well as to reduce unnecessary power consumption of a vehicle-mount camera.

DETAILED DESCRIPTION OF THE PREFERRED EMBODIMENTS

Hereinafter, an embodiment of the present invention will be described with reference to the drawings.

Figure 1:
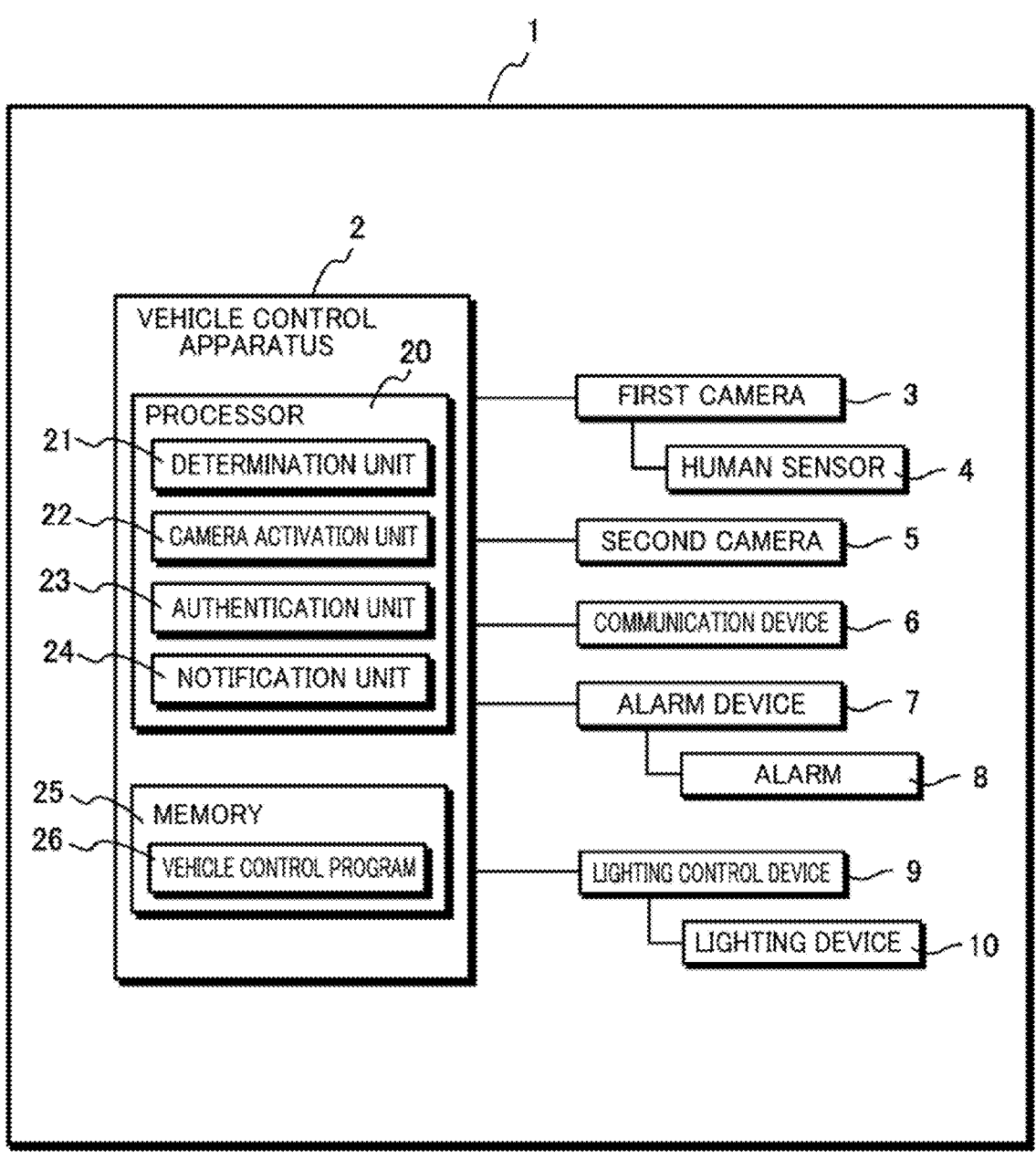
FIG. 1 is a configuration diagram of a vehicle having a vehicle control apparatus of an embodiment of the present invention.

FIG. 1 is a configuration diagram of a vehicle 1 having a vehicle control apparatus 2 of the present embodiment.

The vehicle control apparatus 2 includes a processor 20, and a memory 25. The memory 25 is constituted by, for example, volatile and/or non-volatile semiconductor memory, and/or a hard disk device. The processor 20 is a computer installed in the vehicle control apparatus 2, and is constituted by, for example, one or a plurality of central processing units (CPUs) or micro processing units (MPUs).

The vehicle control apparatus 2 is connected so as to be able to communicate with a first camera 3, a second camera 5, a communication device 6, an alarm device 7, and a lighting control device 9. The first camera 3 and the second camera 5 are constituted, for example, using a charge coupled device (CCD). The first camera 3 and the second camera 5 have mutually different resolutions, and the resolution of the second camera 5 is higher than the resolution of the first camera 3. Therefore, the power consumption of the second camera 5 is more than the power consumption of the first camera 3.

In the present embodiment, the first camera 3 and the second camera 5 are both used for an authentication operation for entry of a user to the vehicle 1, and are used for detecting an approaching person, and acquiring an authentication image (for example, a face image) of the approaching person, respectively. A human sensor 4 is connected to the first camera 3. The human sensor 4 is a passive infrared ray (PIR) sensor, and detects a person, a small animal, etc. by detecting an infrared ray emitted from an object. The first camera 3 is activated to start capturing an image upon detection of a person, a small animal or the like by the human sensor 4, and transmits the captured image to the vehicle control apparatus 2. The first camera 3 stops the operation when a period during which the human sensor 4 does not detect a person, a small animal, etc. continues for a predetermined time.

Figure 2:
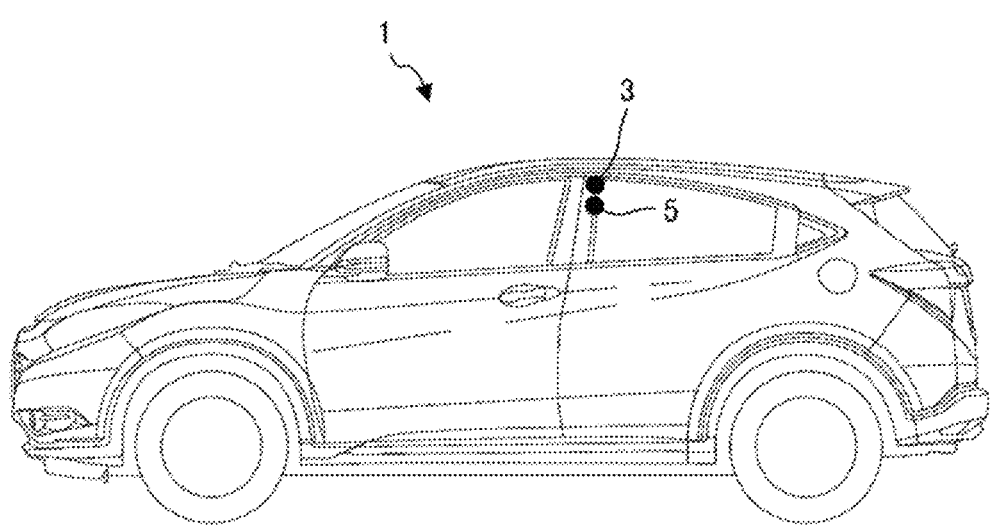
FIG. 2 is a view showing an example of placement of a first camera and a second camera on the vehicle.

FIG. 2 is a view showing an example of placement of the first camera 3 and the second camera 5 on the vehicle 1. The vehicle 1 is a so-called left handle vehicle with a driver seat on the left side when facing the front of the vehicle body. In the example of FIG. 2, the first camera 3 and the second camera 5 are disposed one above another at the center of the left side surface of the vehicle body, that is, a so-called B pillar portion, to authenticate a user entering the vehicle 1 as a driver.

Referring to FIG. 1, the communication device 6 has a wireless transceiver, and is capable of communicating with a mobile terminal, such as a mobile phone, through an external communication network. The alarm device 7 controls an operation of an alarm 8 of the vehicle 1. Moreover, the lighting control device 9 controls lighting of a lighting device 10, such as a headlamp, a taillamp, a side marker light, and a turn signal light.

The processor 20 of the vehicle control apparatus 2 has a determination unit 21, a camera activation unit 22, an authentication unit 23, and a notification unit 24, as function elements or function units. These function elements of the processor 20 are realized by, for example, the processor 20 as a computer executing a vehicle control program 26 that is a computer program stored in the memory 25. Alternatively, it is possible to configure the processor 20 by constituting all or part of the function elements of the processor 20 by hardware including one or more electronic circuit components. Note that the vehicle control program 26 can be stored in an arbitrary computer-readable recording medium, such as an optical disk, a magnetic disk, and a flash memory.

The determination unit 21 acquires, from the first camera 3 with a first resolution, a captured image of an object existing around the vehicle 1, and determines, based on the acquired captured image, whether the object is a person or not. For example, the determination unit 21 determines whether the object is a person or not by marching patterns of a standard image of a person stored in the memory 25 in advance and the captured image of the object according to a conventional technique.

The camera activation unit 22 sets, on the captured image of the first camera 3, a first area corresponding to a range of a predetermined first distance from the vehicle 1, and activates the second camera 5 when the image of a person as the object enters the first area, the second camera having a second resolution higher than the first resolution. Consequently, in the vehicle control apparatus 2, since the second camera 5, which is a high resolution camera consuming a lot of power, is not activated until the person approaches the vehicle 1, an unnecessary operation of the second camera 5 can be prevented. Thus, with the vehicle control apparatus 2, it is possible to reduce unnecessary power consumption, and, when there is a person approaching the vehicle 1, it is possible to accurately perform, for example, face authentication for the person using a high resolution image captured by the second camera 5. Hereinafter, the range of the first distance from the vehicle 1 will be referred to as the first distance range.

Figure 3:
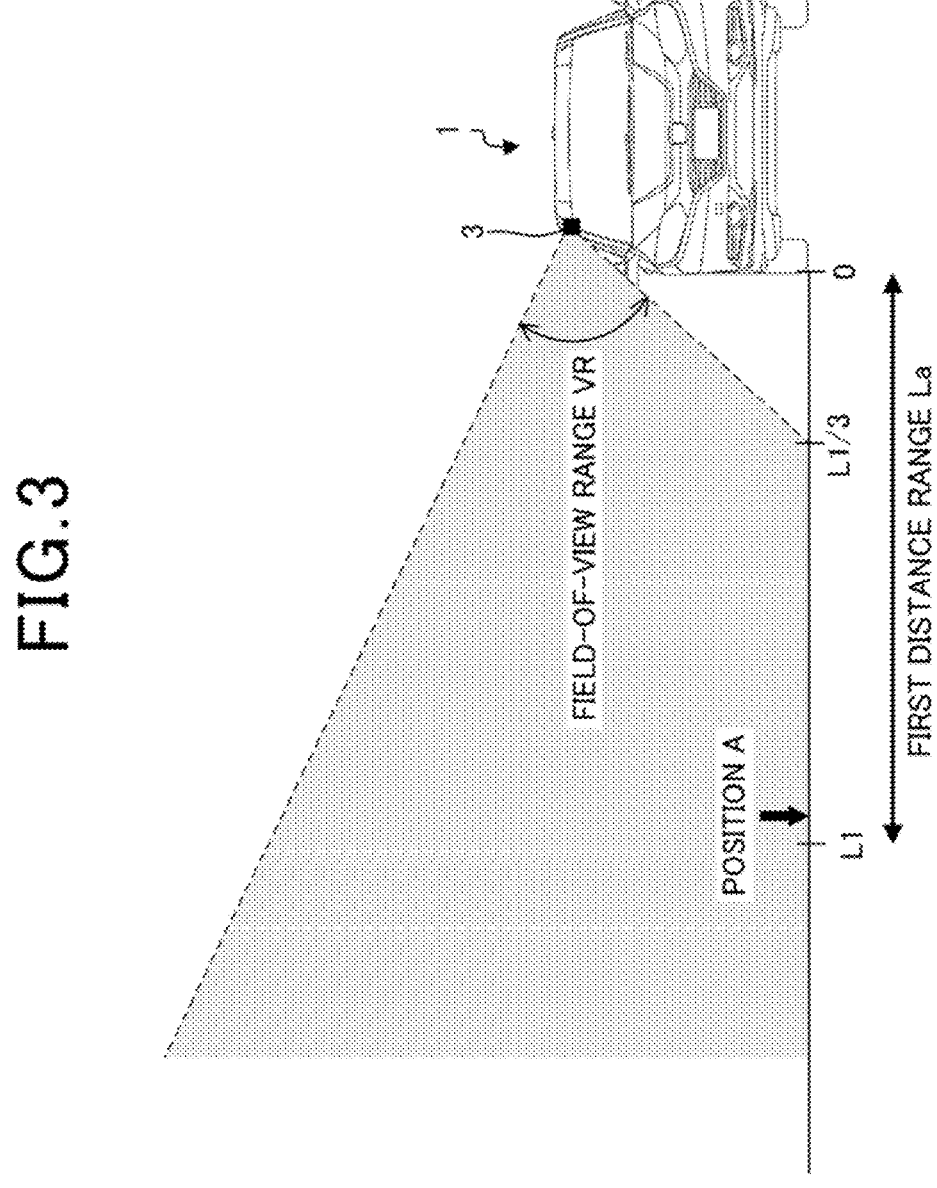
FIG. 3 is a view showing an example of the relationship between a field-of-view range of the first camera and a first distance range as viewed from the front of the vehicle.
Figure 4:
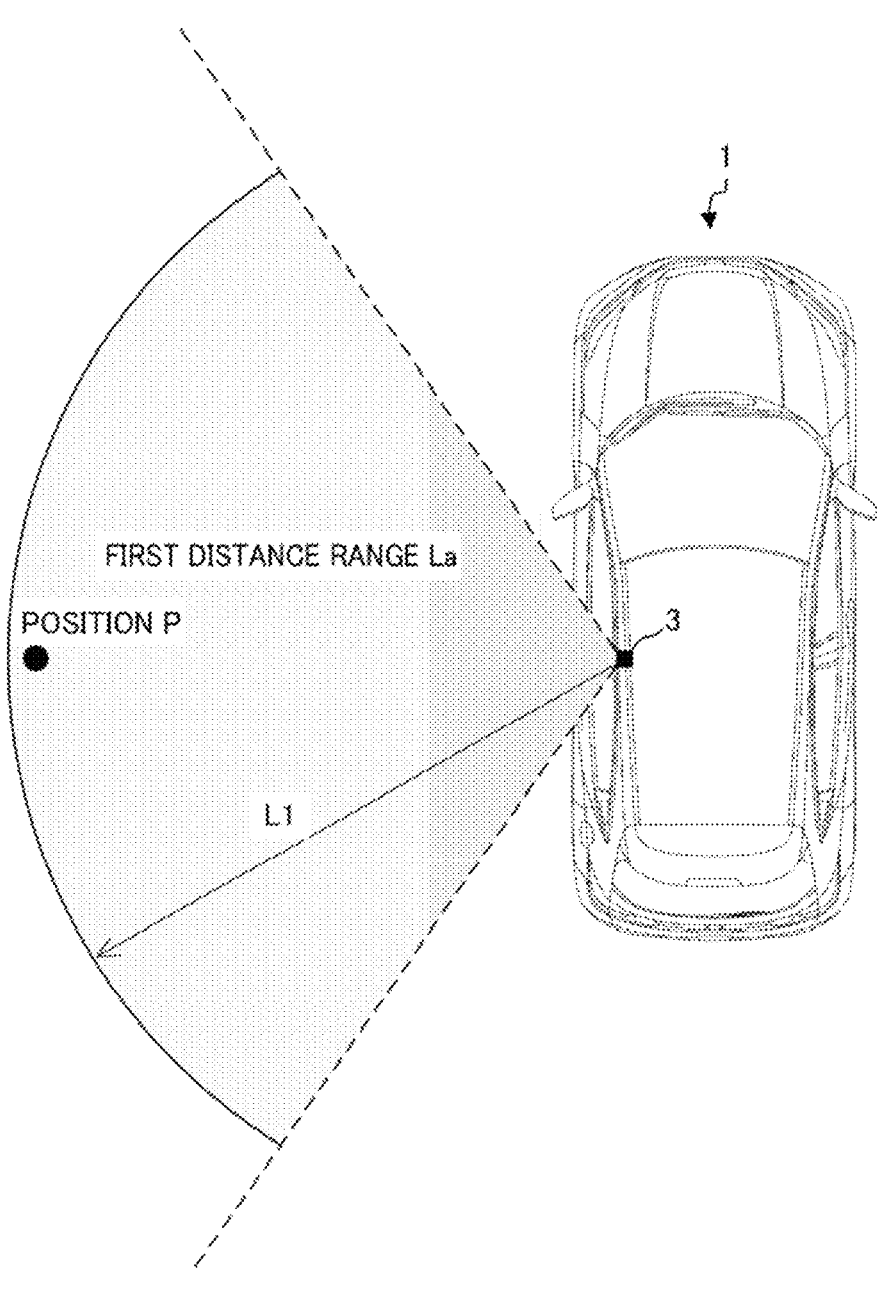
FIG. 4 is a view showing the relationship between the vehicle and the first distance range as viewed from above the vehicle.
Figure 5:
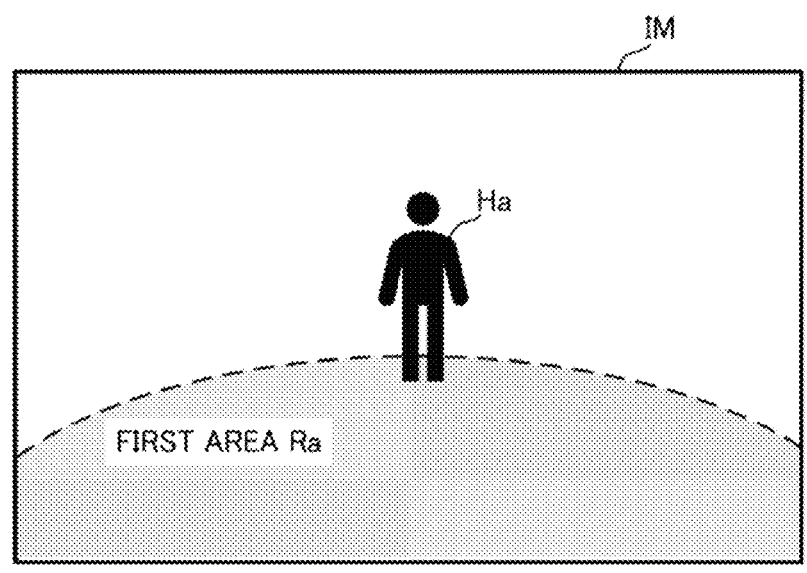
FIG. 5 is a view showing an example of setting a first area on an image captured by the first camera.

FIG. 3 is a view showing an example of the relationship between a field-of-view range of the first camera 3 as viewed from the front of the vehicle 1 and the first distance range corresponding to the first area. Further, FIG. 4 is a view showing the relationship between the vehicle 1 and the first distance range as viewed from above the vehicle 1. In the example of FIG. 4, a first distance range La is set, for example, as a range of a first distance L1 (for example, 4 m) from the vehicle 1, and a field-of-view range VR of the first camera 3 is set, for example, as a range in which the position at a distance L1/3 from the vehicle 1 is the lower limit of the captured image. Consequently, the first camera 3 acquires, for example, a captured image IM as shown in FIG. 5. The camera activation unit 22 sets a first area Ra (a hatching portion in FIG. 5) corresponding to the first distance range La, on the captured image IM shown in FIG. 5.

For example, when at least a part of the image of the person determined by the determination unit 21 is in the first area Ra in the captured image IM of the first camera 3, the camera activation unit 22 determines that the image of the person is in the first area, and activates the second camera 5. For example, regarding a person standing at a position P on a side of the vehicle 1 relative to a boundary line of the first distance range La shown in FIG. 3 and FIG. 4, in the captured image IM shown in FIG. 5, like a person image Ha, a lower end that is the feet of the person overlaps the inside of the first area Ra. Therefore, the camera activation unit 22 activates the second camera 5 because a part of the person image Ha is in the first area Ra.

Specifically, the camera activation unit 22 activates the second camera 5 if any of the following activation conditions is met.

a. A residence time of the person image in the first area Ra is equal to or more than a predetermined time (for example, two seconds).

b. The person image changes direction a plurality of times in a horizontal direction in the first area Ra.

c. The person image enters the first area Ra from an area other than the first area Ra on the captured image IM of the first camera 3.

d. The size of the person image in the first area Ra is larger relative to the size of the person image in an area other than the first area Ra.

If the activation condition is a, the second camera 5 is activated with respect to a person who stands still near the vehicle 1 and is presumed to wish to enter the vehicle, thereby preventing unnecessary power consumption.

If the activation condition is b, for example, even when a user who is not used to keyless face authentication entry does not know what to do and wanders around in front of the vehicle 1, the second camera 5 can be activated timely.

If the activation condition is c, a person approaching to enter the vehicle 1 with an intention to enter the vehicle 1 is detected based on the movement of the person image to the first area from an area outside the first area, and the second camera 5 can be activated timely.

If the activation condition is d, a person approaching with an intention to enter the vehicle 1 is detected based on a change in the size of the person image, and the second camera 5 can be activated timely.

Moreover, the camera activation unit 22 is capable of not activating the second camera 5 when it is determined, based on the captured image IM of the first camera 3, that the person has entered the first distance range La from an area outside the first distance range La corresponding to the first area Ra without deceleration. Consequently, it is possible to determine whether the person in the captured image IM of the first camera 3 is a passerby passing by the vehicle 1 without an intention to enter the vehicle 1, based on whether or not the person decelerates near the vehicle 1, and prevent unnecessary activation of the second camera 5.

Further, if the person is not authenticated by a later-described authentication unit 23 within a predetermined first time after activation of the second camera 5, the camera activation unit 22 may stop the operation of the second camera 5. Consequently, for example, when the high resolution camera is activated due to a person who is approaching without an intention to enter the vehicle 1, it is possible to turn off the high resolution camera, and prevent unnecessary power consumption.

Furthermore, when the number of times the second camera 5 is stopped because the person is not authenticated within a predetermined second time exceeds a predetermined number of times, the second time being longer than the first time, the camera activation unit 22 sets, inside the first area, a second area corresponding to a range of a second predetermined distance (for example, equal to longer than 2 m and less than 3 m) from the vehicle, the second predetermined distance being shorter than a first predetermined distance. Then, if the image of the person enters the second area, the camera activation unit 22 can activate the second camera. Consequently, for example, when there are many people coming and going around the vehicle and authentication failure happens repeatedly for people who are not a registered user, it is possible to prevent unnecessary activation of the second camera 5 by activating the second camera 5 with respect to a person who approaches the vehicle more closely than usual.

Hereinafter, the range of the second distance from the vehicle 1 will be referred to as the second distance range.

Figure 6:
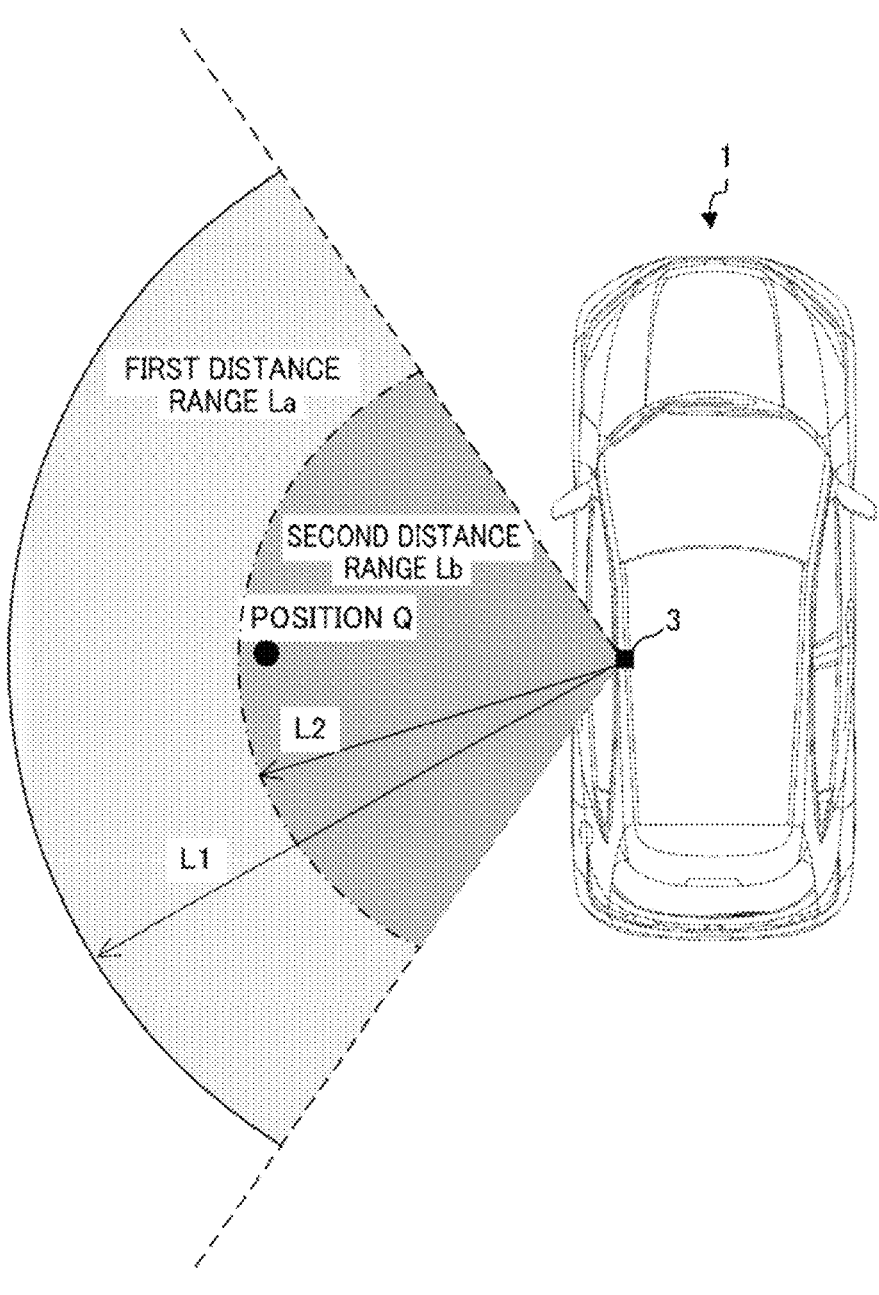
FIG. 6 is a view showing the relationship between the first distance range and a second distance range as viewed from above the vehicle.
Figure 7:
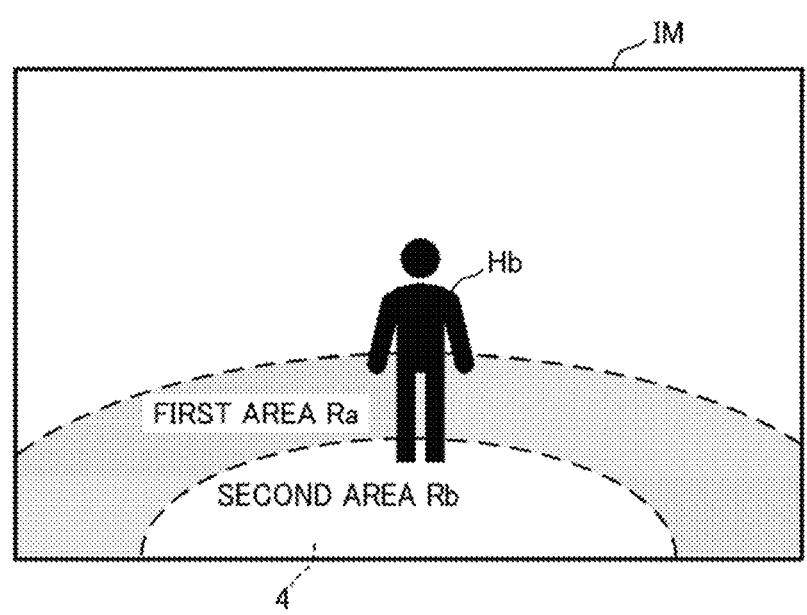
FIG. 7 is a view showing an example of setting a second area on the captured image of the first camera.

FIG. 6 is a view showing the relationship between the first distance range La corresponding to the first area Ra and a second distance range Lb as viewed from above the vehicle 1. In the example shown in FIG. 6, the second distance range Lb is, for example, a range of a distance L2 (for example, 2.5 m) from the vehicle 1. The camera activation unit 22 sets a second area Rb corresponding to the second distance range Lb, on the captured image IM of the first camera 3. FIG. 7 is a view showing an example of setting the second area Rb on the captured image IM of the first camera 3. As shown in the drawing, the second area Rb is a location overlapping the first area Ra along the lower side of the captured image IM shown in the drawing.

For example, when at least a part of the image of the person is within the second area Rb on the captured image IM of the first camera 3, the camera activation unit 22 determines that the image of the person has entered the second area Rb, and activates the second camera 5. For example, regarding a person standing at a position Q on a side of the vehicle 1 relative to a boundary line of the second distance range Lb shown in FIG. 6, in the captured image IM shown in FIG. 7, like a person image Hb, the lower end that is the feet of the person overlaps the inside of the second area Rb. Therefore, the camera activation unit 22 determines that the person image Hb has entered the second area Ra, and activates the second camera 5.

The authentication unit 23 acquires a face image of the person by the second camera 5, and authenticates whether the person is a registered user or not. This authentication is performed according to a conventional technique by the authentication unit 23 which performs pattern matching of the face image of the registered user prestored in the memory 25 and the acquired face image, and/or compares feature portions extracted from these face images.

The notification unit 24 gives a notification to the outside of the vehicle 1. When the camera activation unit 22 determines, after setting the second area, that a person is present in the first area outside the second area, the notification unit 24 gives a mobile terminal of a predetermined person who is the registered user of the vehicle 1 a notification that the second area is set. Here, the mobile terminal may be, for example, a mobile phone such as a smart phone. Moreover, the predetermined person may include an owner of the vehicle 1. Access information, such as a mail address, to the mobile terminal of the predetermined person can be prestored in the memory 25.

When the second area is set, face authentication is not started unless a person approaches the vehicle 1 more closely than usual, and therefore, for example, a user who is used to face authentication in the first area may be confused.

Since the notification unit 24 notifies, through the operation, the predetermined registered user that the second area is set, the registered user can make smoothly entry to the vehicle 1.

Further, when the camera activation unit 22 determines, after setting the second area, that a person is present in the first area outside the second area, the notification unit 24 gives a notification to the surroundings of the vehicle 1 as a notification to the outside of the vehicle 1. Specifically, for example, the notification unit 24 instructs the alarm device 7 to output a notification sound from the alarm 8 of the vehicle 1, and/or instructs the lighting control device 9 to turn on the lighting device 10 mounted on the vehicle 1. Consequently, even if the predetermined registered user does not have a mobile terminal, when the person approaches the vehicle, it is possible to notify the person that the second area is set.

Figure 8:
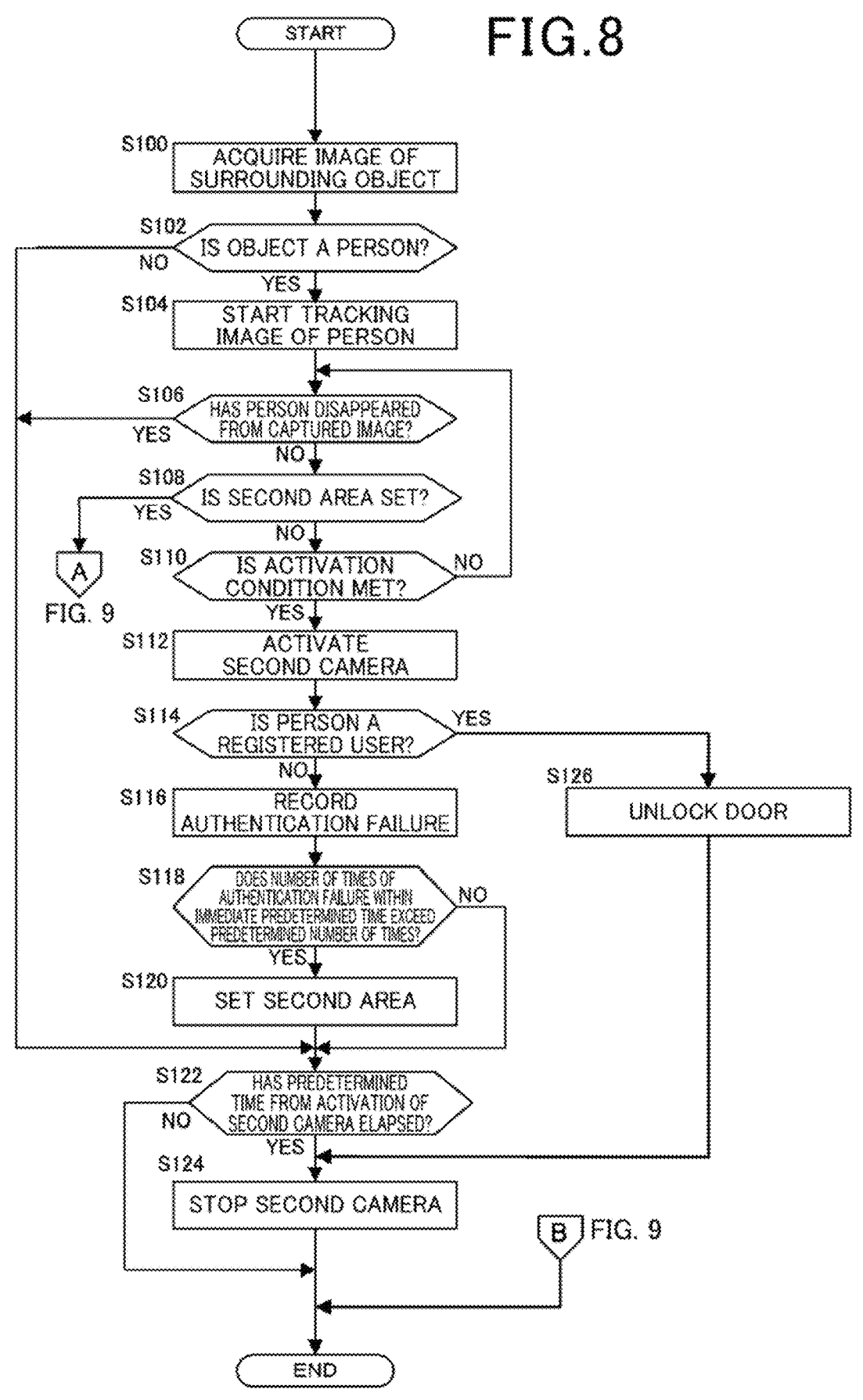
FIG. 8 is a flowchart showing the procedure of an operation of the vehicle control apparatus.
Figure 9:
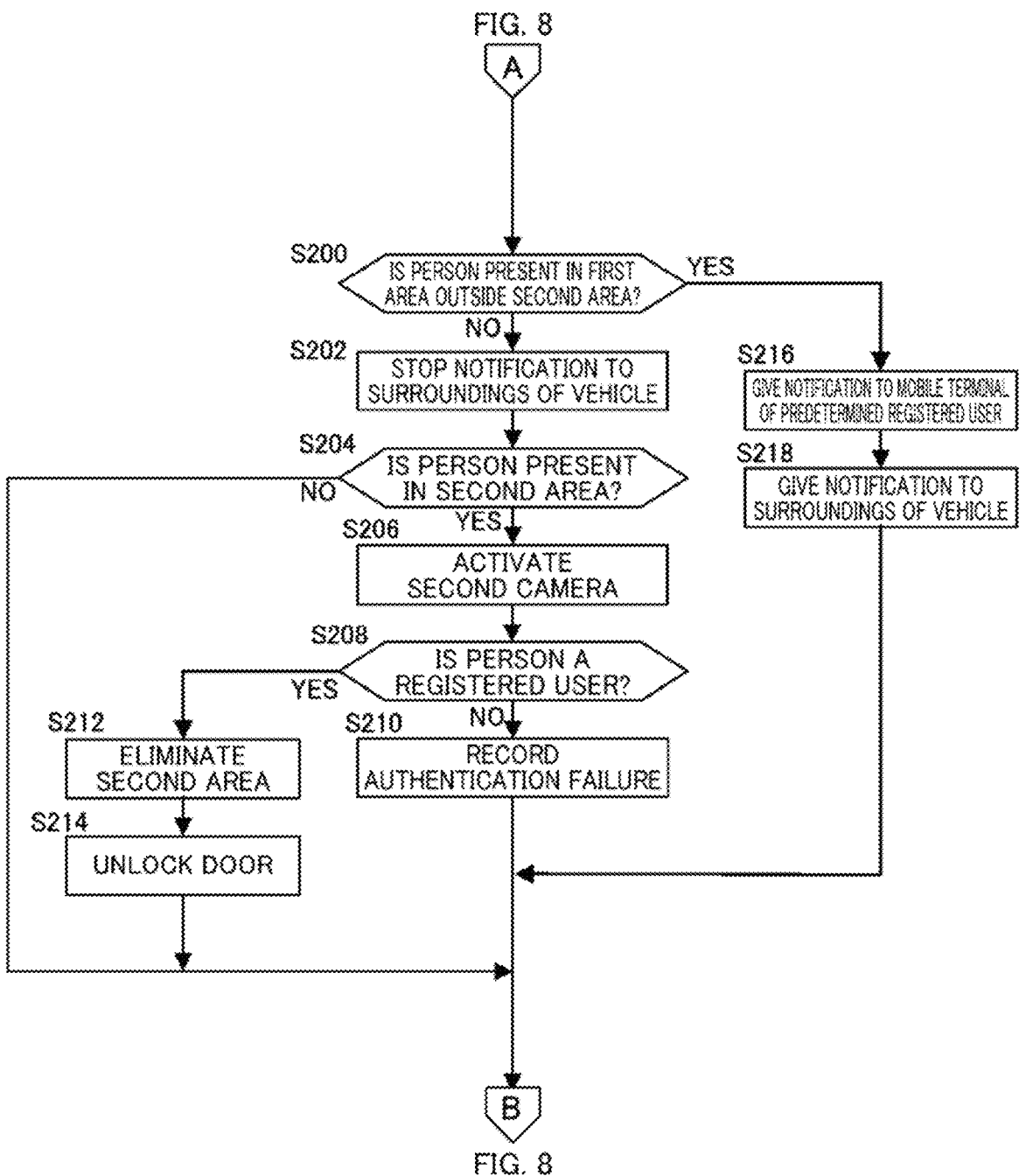
FIG. 9 is a flowchart showing the procedure of the operation of the vehicle control apparatus.

Next, the procedure of the operation of the vehicle control apparatus 2 will be described. FIG. 8 and FIG. 9 are flowcharts showing an example of the procedure of the operation of the vehicle control apparatus 2. The process shown in FIG. 8 and FIG. 9 is repeatedly executed. In parallel with the process of FIG. 8 and FIG. 9, the first camera 3 starts operating in response to detection of a person or a small animal by the human sensor 4, captures images around the vehicle 1 at predetermined time intervals, and transmits the images to the vehicle control apparatus 2.

When the process is started, the determination unit 21 acquires a captured image of an object existing around the vehicle 1 from the first camera 3 (S100), and determines, based on the acquired captured image, whether the object is a person or not (S102). Then, if the object is determined to be a person (S102, YES), the camera activation unit 22 starts, according to the conventional technique, tracking the image of the person determined to be the person by the determination unit 21, as necessary (S104).

Subsequently, the camera activation unit 22 determines whether or not the image of the person has disappeared from the captured image of the first camera 3 (S106). Then, if the image of the person has not disappeared from the captured image of the first camera 3 (S106, NO), the camera activation unit 22 determines whether or not the second area is set on the captured images of the first camera 3 (S108). Then, if the second area is not set (S108, NO), the camera activation unit 22 determines whether or not at least any one of the activation conditions is met (S110).

Then, if any one of the activation conditions is met (S110, YES), the camera activation unit 22 activates the second camera 5 if the second camera 5 has not been activated yet (S112). The activated second camera 5 captures images around the vehicle 1 at predetermined time intervals, and transmits the captured images to the vehicle control apparatus 2.

Subsequently, the authentication unit 23 acquires a face image of the person by the second camera 5, and determines whether the person is a registered user or not (S114). Then, if the person is not a registered user (S114, NO), the authentication unit 23 stores the current time and the result of authentication failure in the memory 25 as the authentication history (S116).

Next, the camera activation unit 22 refers to the authentication history, and determines whether or not the number of times of authentication failure within an immediate predetermined time exceeds a predetermined number of times (S118). Then, if the number of times of authentication failure exceeds the predetermined number of times (S118, YES), the camera activation unit 22 sets the second area on the captured images of the first camera 3 (S120).

Next, the camera activation unit 22 determines whether or not an elapsed time after the activation of the second camera 5 exceeds a predetermined time (S122). Then, if the elapsed time exceeds the predetermined time (S122, YES), the camera activation unit 22 stops the operation of the second camera 5 (S124), and ends the process.

On the other hand, if the elapsed time after the activation of the second camera 5 does not exceed the predetermined time in step S122 (S122, NO), the camera activation unit 22 ends the process without stopping the operation of the second camera 5. On the other hand, if the number of times of authentication failure within the immediate predetermined time does not exceed the predetermined number of times in step S118 (S118, NO), the camera activation unit 22 moves the process to step S122 without setting the second area.

On the other hand, if the person captured by the second camera 5 is the registered user in step S114 (S114, YES), the authentication unit 23 instructs, for example, a door lock mechanism (not shown) installed in a vehicle door of the vehicle 1 to unlock the vehicle door (S126). Thereafter, the authentication unit 23 moves the process to step S124. Consequently, when the person authentication has succeeded, the second camera 5 is stopped.

On the other hand, if any of the activation conditions is not met in step S110 (S110, NO), the camera activation unit 22 moves the process back to step S106. On the other hand, if the image of the person has disappeared from the captured image of the first camera 3 in step S106 (S106, YES), the camera activation unit 22 moves the process to step S122. Consequently, when the image of the person has disappeared from the captured image of the first camera 3 without meeting the activation conditions, if the predetermined time has elapsed, the second camera 5 is stopped, and then the process is ended.

On the other hand, if it is determined in step S108 that the second area is set (S108, YES), the camera activation unit 22 moves the process to step S200 of FIG. 8.

In step S200 of FIG. 8, the camera activation unit 22 determines whether or not the image of the person is in the first area outside the second area (S200). Then, if the image of the person is in the first area outside the second area (S200, YES), the notification unit 24 gives a mobile terminal of a predetermined person who is the registered user of the vehicle 1 a notification that the second area is set (S216). Moreover, the notification unit 24 gives the notification to the surroundings of the vehicle 1 by instructing the alarm device 7 to output an alarm sound, and/or instructing the lighting control device 9 to turn of the lighting device 10 (S218), and thereafter the process moves to step S122 of FIG. 8, and, if the predetermined time has elapsed, the second camera 5 is stopped, and then the process is ended.

On the other hand, if it is determined in step S200 that the image of the person is not in the first area outside the second area (S200, NO), the notification unit 24 stops the notification to the surroundings of the vehicle 1, which was started in step S220 during the previous process (S202). Next, the camera activation unit 22 determines whether or not the image of the person has moved to the second area (S204). Then, if the person image is in the second area (S204, YES), the camera activation unit 22 activates the second camera 5 (S206).

Subsequently, the authentication unit 23 determines whether or not the person captured by the second camera 5 is the registered user or not (S208). Then, if the person is not the registered user (S208, NO), the authentication unit 23 stores the current time and the result of authentication failure in the memory 25 as the authentication history (S210), and moves the process to step S122.

On the other hand, if the person is the registered user in step S208 (S208, YES), the camera activation unit 22 deletes the second area set on the captured image of the first camera 3 (S212). Subsequently, similarly to step S126, for example, the authentication unit 23 instructs the door lock mechanism (not shown) installed in the vehicle door of the vehicle 1 to unlock the vehicle door (S214), and then moves the process to step S122 of FIG. 8.

On the other hand, if it is determined in step S204 that the person image is not in the second area (S204, NO), the camera activation unit 22 moves the process to step S122 of FIG. 8.

Note that, the present invention is not limited to the configurations of the above-described embodiment and modifications thereof, and can be implemented in various forms within a scope not departing from the gist of the invention.

For example, in the present embodiment, when two cameras, namely, the first camera 3 and the second camera 5 having a higher resolution and consuming more power than the first camera 3, are mounted on the vehicle 1, the camera activation unit 22 reduces unnecessary power consumption of the vehicle 1 by restricting an unnecessary operation of the second camera 5. However, the configuration of the cameras on the vehicle 1 is not limited to the above. For example, one camera capable of switching between a low precision mode and a high precision mode may be mounted on the vehicle 1. Here, the low precision mode is an operation mode in which imaging is performed with low current consumption and low resolution, and the high precision mode is an operation mode in which imaging is performed with high current consumption and high resolution. The camera activation unit 22 can switch the camera to the high precision mode and to the low precision mode, instead of activating and stopping the second camera 5 as in the above-described embodiment.

Moreover, in the present embodiment, although the captured image of the second camera 5 is used for face authentication for the user by the authentication unit 23, the usage of the second camera 5 is not limited to the user authentication. For example, the second camera 5 may be used as a security camera for imaging an attacker to the vehicle 1, who is approaching the vehicle 1. In this case, since the vehicle control apparatus 2 can appropriately capture the person who is approaching with an intention to attack the vehicle 1, and activate the second camera 5, it is possible to reduce power consumption by preventing unnecessary activation of the second camera 5, and appropriately capture the image of the attacker.

The above embodiment supports the following configurations.

(Configuration 1) A vehicle control apparatus including: a determination unit for acquiring a captured image of an object existing around a vehicle from a first camera with a first resolution, and determining, based on the acquired captured image, whether the object is a person or not; and a camera activation unit for setting a first area corresponding to a range of a first distance from the vehicle, on the captured image of the first camera, and activating a second camera when the image of a person as the object enters the first area, the second camera having a second resolution higher than the first resolution.

According to the vehicle control apparatus of Configuration 1, since an unnecessary operation of a high resolution camera which consumes a lot of power can be prevented, it is possible to accurately perform image authentication for the person approaching the vehicle, as well as to reduce unnecessary power consumption.

(Configuration 2) The vehicle control apparatus according to Configuration 1, wherein the camera activation unit activates the second camera when a residence time of the image of the person in the first area is equal to or more than a predetermined time.

According to the vehicle control apparatus of Configuration 2, since the high resolution camera is activated with respect to a person who is standing still near the vehicle and presumed to wish to enter the vehicle, unnecessary power consumption can be prevented.

(Configuration 3) The vehicle control apparatus according to Configuration 1 or 2, wherein the camera activation unit activates the second camera when the image of the person changes direction a plurality of times in a horizontal direction in the first area.

According to the vehicle control apparatus of Configuration 3, even when a user who is not used to keyless face authentication entry does not know what to do and wanders around in front of the vehicle, the high resolution camera can be activated timely.

(Configuration 4) The vehicle control apparatus according to any one of Configurations 1 to 3, wherein the camera activation unit activates the second camera when the image of the person enters the first area from an area outside the first area on the captured image of the first camera.

According to the vehicle control apparatus of Configuration 4, a person who is approaching with an intention to enter the vehicle is detected based on a movement of the person image to the first area from the area outside the first area, and the high resolution camera can be activated timely.

(Configuration 5) The vehicle control apparatus according to any one of Configurations 1 to 4, wherein the camera activation unit activates the second camera when a size of the image of the person in the first area is larger relative to a size of the image of the person in the area outside the first area.

According to the vehicle control apparatus of Configuration 5, a person who is approaching with an intention to enter the vehicle is detected based on a change in the size of the person image, and the high resolution camera can be activated timely.

(Configuration 6) The vehicle control apparatus according to any one of Configurations 1 to 5, wherein the camera activation unit does not activate the second camera when it is determined, based on the captured image of the first camera, that the person has entered within the range of the first distance from a place other than the range of the first distance without deceleration.

According to the vehicle control apparatus of Configuration 6, it is possible to determine whether the person is a passerby passing by the vehicle without an intention to enter the vehicle, based on whether or not the person decelerates near the vehicle, and prevent unnecessary activation of the high resolution camera.

(Configuration 7) The vehicle control apparatus according to any one of Configurations 1 to 6, includes an authentication unit for acquiring a face image of the person by the second camera, and authenticating whether the person is a registered user or not, wherein the camera activation unit stops operating the second camera if the person is not authenticated by the authentication unit within a predetermined time after activation of the second camera.

According to the vehicle control apparatus of Configuration 7, for example, when the high resolution camera is activated based on a person who is approaching without an intention to enter the vehicle 1, it is possible to turn off the high resolution camera, and prevent unnecessary power consumption.

(Configuration 8) The vehicle control apparatus according to Configuration 7, wherein, when the number of times the second camera is stopped because the person is not authenticated within the predetermined time exceeds a predetermined number of times, the camera activation unit sets, inside the first area, a second area corresponding to a range of a second predetermined distance from the vehicle, the second predetermined distance being shorter than the first distance, and activates the second camera when the image of the person enters the second area.

According to the vehicle control apparatus of Configuration 8, for example, when there are many people coming and going around the vehicle and authentication failure happens repeatedly for people who are not a registered user, it is possible to prevent unnecessary activation of the high resolution camera by activating the high resolution camera with respect to a person who approaches the vehicle more closely than usual.

(Configuration 9) The vehicle control apparatus according to Configuration 8, includes a notification unit for giving a notification to the outside of the vehicle, wherein, when the camera activation unit determines, after setting the second area, that the image of the person is present in the first area outside the second area, the notification unit gives a mobile terminal of a predetermined person who is the registered user a notification that the second area is set.

When the second area is set, since face authentication is not started unless a person approaches the vehicle more closely than usual, for example, a user who is used to face authentication in the first area may be confused. According to the vehicle control apparatus of Configuration 9, since the predetermined registered user is notified that the second area is set, the registered user can make smoothly entry to the vehicle.

(Configuration 10) The vehicle control apparatus according to Configuration 9, wherein, when the camera activation unit determines, after setting the second area, that the image of the person is present in the first area outside the second area, the notification unit gives the notification to the outside of the vehicle.

According to the vehicle control apparatus of Configuration 10, even if the predetermined person in Configuration 9 does not have a mobile terminal, when the person approaches the vehicle, it is possible to notify the person that the second area is set.

(Configuration 11) A vehicle control method to be executed by a computer of a vehicle control apparatus, the vehicle control method including: a step for acquiring a captured image of an object existing around a vehicle from a first camera with a first resolution, and determining, based on the acquired captured image, whether the object is a person or not; and a step for setting a first area corresponding to a range of a first distance from the vehicle, on the captured image of the first camera, and activating a second camera when the image of a person as the object enters the first area, the second camera having a second resolution higher than the first resolution.

According to the vehicle control method of Configuration 11, since an unnecessary operation of the high resolution camera which consumes a lot of power can be prevented, it is possible to accurately perform image authentication for the person approaching the vehicle, as well as to reduce unnecessary power consumption.

REFERENCE SIGNS LIST

1 vehicle,
2 vehicle control apparatus,
3 first camera,
4 human sensor,
5 second camera,
6 communication device,
7 alarm device,
8 alarm,
9 lighting control device,
10 lighting device,
20 processor,
21 determination unit,
22 camera activation unit,
23 authentication unit,
24 notification unit,
25 memory,
26 vehicle control program,
Ha, Hb humane image,
IM captured image,
La first distance range,
Lb second distance range,
Ra first area,
Rb second area, and
VR field-of-view range.

What is claimed is:

1. A vehicle control apparatus comprising a processor, wherein the processor:

acquires a captured image of an object existing around a vehicle from a first camera with a first resolution, and determines, based on the acquired captured image, whether the object is a person or not; and sets a first area corresponding to a range of a first predetermined distance from the vehicle, on the captured image of the first camera, and activates a second camera when the image of a person as the object enters the first area, the second camera having a second resolution higher than the first resolution;

acquires a face image of the person by the second camera, and authenticates whether the person is a registered user or not; and stops operating the second camera in response to the registered user not being authenticated within a predetermined time after activation of the second camera, wherein, when a number of times the second camera is stopped because the person is not authenticated within the predetermined time exceeds a predetermined number of times, the processor sets, inside the first area, a second area corresponding to a range of a second predetermined distance from the vehicle, the second predetermined distance being shorter than the first predetermined distance, and activates the second camera when the image of the person enters the second area.

2. The vehicle control apparatus according to claim 1, further comprising a notification unit for giving a notification to the outside of the vehicle, wherein, when the processor determines that the image of the person is present in the first area outside the second area after setting the second area, the notification unit gives a mobile terminal of a predetermined person who is the registered user a notification that the second area is set.

3. The vehicle control apparatus according to claim 2, wherein, when the processor determines that the image of the person is present in the first area outside the second area after setting the second area, the notification unit gives the notification to the outside of the vehicle.

4. The vehicle control apparatus according to claim 1, wherein the processor activates the second camera when a residence time of the image of the person in the first area is equal to or more than a predetermined time.

5. The vehicle control apparatus according to claim 1, wherein the processor activates the second camera when the image of the person changes direction a plurality of times in a horizontal direction in the first area.

6. The vehicle control apparatus according to claim 1, wherein the processor activates the second camera when the image of the person enters the first area from an area outside the first area on the captured image of the first camera.

7. The vehicle control apparatus according to claim 1, wherein the processor activates the second camera when a size of the image of the person in the first area is larger relative to a size of the image of the person in an area outside the first area.

8. The vehicle control apparatus according to claim 1, wherein the processor does not activate the second camera when it is determined, based on the captured image of the first camera, that the person has entered within the range of the first predetermined distance from a place other than the range of the first predetermined distance without deceleration.

9. A vehicle control method to be executed by a computer of a vehicle control apparatus, the vehicle control method comprising:

a step for acquiring a captured image of an object existing around a vehicle from a first camera with a first resolution, and determining, based on the acquired captured image, whether the object is a person or not;

a step for setting a first area corresponding to a range of a first predetermined distance from the vehicle, on the captured image of the first camera, and activating a second camera when the image of a person as the object enters the first area, the second camera having a second resolution higher than the first resolution;

a step of acquiring a face image of the person by the second camera, and authenticating whether the person is a registered user or not;

a step of stopping operating the second camera in response to the registered user not being authenticated within a predetermined time after activation of the second camera; and a step of, when a number of times the second camera is stopped because the person is not authenticated within the predetermined time exceeds a predetermined number of times, setting, inside the first area, a second area corresponding to a range of a second predetermined distance from the vehicle, the second predetermined distance being shorter than the first predetermined distance, and activating the second camera when the image of the person enters the second area.

\* \* \* \* \*